United States Patent [19]
Burrow, Jr.

[11] 3,741,574
[45] June 26, 1973

[54] CART FOR TRANSPORTING TELEVISION SET

[76] Inventor: John M. Burrow, Jr., 307 N. Main Street, Lafayette, Ga. 30728

[22] Filed: Dec. 30, 1971

[21] Appl. No.: 214,184

[52] U.S. Cl................ 280/5.32, 280/5.32, 280/47.2
[51] Int. Cl............................................. B60p 3/22
[58] Field of Search................... 280/5.32, 5.28, 5.2

[56] References Cited
UNITED STATES PATENTS
849,996 4/1907 Hass................................. 280/5.32
1,246,721 11/1917 Crawford........................... 280/5.32
FOREIGN PATENTS OR APPLICATIONS
689,124 3/1953 Great Britain..................... 280/5.32

Primary Examiner—Leo Friaglia
Attorney—Lamont Johnston

[57] ABSTRACT

A cart supports a television set for moving up and down steps. To move up steps, a pair of wheels of relatively small diameter is placed on a first step and then a pair of wheels of large diameter is moved onto the same step by pivoting the frame of the cart about the axle of the pair of smaller wheels. After the larger pair of wheels rests on the first step, the frame of the cart is then pivoted about the axle of the larger pair of wheels to advance the smaller set of wheels to the next step. To move down steps, the opposite procedure is employed. The axle of the smaller pair of wheels is disposed from the axle of the larger pair of wheels a distance substantially equal to the radius of each of the larger pair of wheels.

2 Claims, 4 Drawing Figures

PATENTED JUN 26 1973 3,741,574

CART FOR TRANSPORTING TELEVISION SET

In servicing television sets, it is occasionally necessary for the serviceman to transport the television set to his shop where additional equipment is available to enable a more detailed diagnosis of the television set to determine what should be repaired. Since most houses have a number of steps, it is practically impossible for a single serviceman to be able to handle the television set, particularly a console model, by himself without damaging the cabinet of the television set.

Accordingly, it then becomes necessary for the serviceman to make a second trip with another person to pick up the set. This not only delays the time when the set is at the shop for repair but also increases the cost for service. While this problem could be avoided by using two servicemen initially, this would create a relatively high overhead for the owner of the shop since television sets can be repaired in the home during many service calls. Therefore, it is not financially feasible for two servicemen to go on all calls to repair television sets.

This problem of handling large television sets is particularly pronounced where a single serviceman owns his own shop. It is then necessary for him to hire another person on a part time basis or to utilize his office help if he has such to pick up large size television sets.

The problem of moving large television sets up and down stairs also exists when installing a new television set. Thus, it is necessary for two persons to normally deliver a television set for installation. This adds to the expense of selling new television sets whereby the profit of the dealer is reduced.

The present invention satisfactorily overcomes the foregoing problems by providing a cart on which a television set may be supported for movement up and down steps by one person. Accordingly, by using the cart of the present invention, a serviceman can pick up the television set at the time of the initial call when he determines that it must be taken to the shop for repair. This results in reduction of overhead whereby a greater profit may be made or the cost to the customer reduced.

Likewise, the cart of the present invention eliminates the need for two men to install a television set. Because the cart permits easy transport of the television set up and down steps and also along level areas, it is only necessary to send one man to install a television set.

While the cart of the present invention is particularly useful to transport large television sets such as console models, it also is capable of transporting portable television sets. This avoids the danger of a serviceman dropping a portable television set which he might normally carry in his arms.

An object of this invention is to provide a cart for transporting a television set, particularly up and down steps.

Another object of this invention is to provide a cart which is capable of transporting portable and console model television sets.

Other objects of this invention will be readily perceived from the following description, claims, and drawing.

This invention relates to a cart for transporting a television set or the like. The cart includes first and second pairs of wheels with each of the wheels of the first pair of wheels having a diameter several times greater than each of the wheels of the second pair of wheels. The first pair of wheels is supported by first axle means, and the second pair of wheels is supported by second axle means. A frame is supported for pivotal movement about the first axle means with the second axle means being supported by the frame at a distance from the pivotal support of the frame about the first axle means and substantially parallel to the first axle means. The second axle means has its longitudinal axis spaced from the longitudinal axis of the first axle means a distance substantially the same as the radius of each of the first pair of wheels whereby the cart may be advanced up steps by placing the second pair of wheels on the first step, pivoting the frame about the longitudinal axis of the second axle means until the first pair of wheels is supported on the first step, and then pivoting the frame in the opposite direction about the longitudinal axis of the first axle means until the second pair of wheels is supported on the next higher step.

The attached drawing illustrates a preferred embodiment of the invention, in which.

Figure 1:
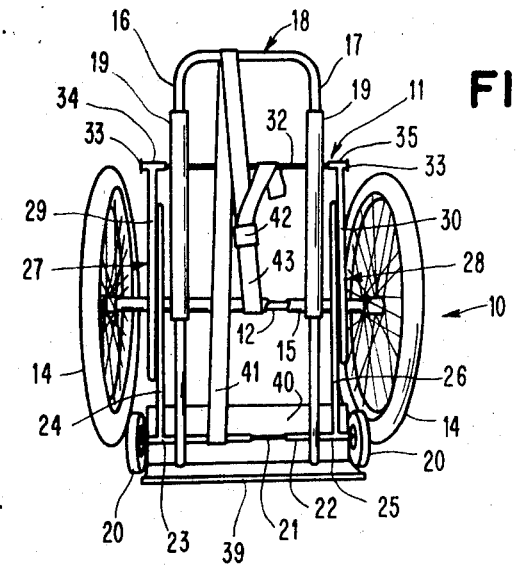
FIG. 1 is a front perspective view of the cart of the present invention with the elements arranged to support a large television set.

Referring to the drawing and particularly FIG. 1, there is shown a cart 10 for transporting a television set. The cart 10 includes a frame 11, which is supported for pivotal movement about an axle 12 of a first pair or set of wheels 14. The axle 12 connects the first pair of wheels 14 to each other and extends through a sleeve 15, which has the frame 11 supported thereon for pivotal movement about the longitudinal axis of the axle 12.

The frame 11 includes substantially parallel portions 16 and 17, which are fixed to the sleeve 15 and form arms of the frame 11, of a hollow rod 18. Accordingly, since the axle 12 is rotatably mounted within the sleeve 15, the frame 11 will pivotally move about the longitudinal axis of the axle 12.

The upper portions of the portions 16 and 17 of the rod 18 are connected to each other so that a handle of the cart 10 is formed. Each of the portions 16 and 17 of the rod 18 is partially covered by a piece of a slit longitudinal rubber tubing 19 to provide protection to any television set supported on the cart 10. The pieces of tubing 19 are easily removable from the portions 16 and 17 whenever desired.

The frame 11 rotatably supports a second pair of wheels 20 at the end remote from the handle of the cart 10. The wheels 20 are connected to each other by an axle 21, which is rotatably supported within a sleeve 22 extending between the portions 16 and 17 of the rod 18. The axle 21 passes through openings in the portions 16 and 17 of the rod 18 aligned with the passage in the sleeve 22 to permit the axle 21 to pass therethrough.

The axle 21, which has its longitudinal axis parallel to the longitudinal axis of the axle 12, is disposed at a distance approximately equal to the radius of each of the wheels 14. The second pair or set of wheels 20 is disposed inside of the path of the first pair or set of wheels 14.

Between the portion 16 of the rod 18 and one of the wheels 20, a hollow portion 23 of a hollow tubular member 24 is disposed. The length of the portion 23 of the tubular member 24 is slightly less than the length of the axle 21 between the portion 16 of the rod 18 and the adjacent wheel 20 so that the hollow tubular member 24 may slide slightly relative thereto along the longitudinal axis of the axle 21.

A hollow portion 25 of a hollow tubular member 26 is disposed between the portion 17 of the rod 18 and the other of the wheels 20. The length of the portion 25 is slightly less than the distance between the portion 17 of the rod 18 and the adjacent wheel 20 so that the hollow tubular member 26 also may slide slightly relative thereto along the longitudinal axis of the axle 21.

Figure 4:
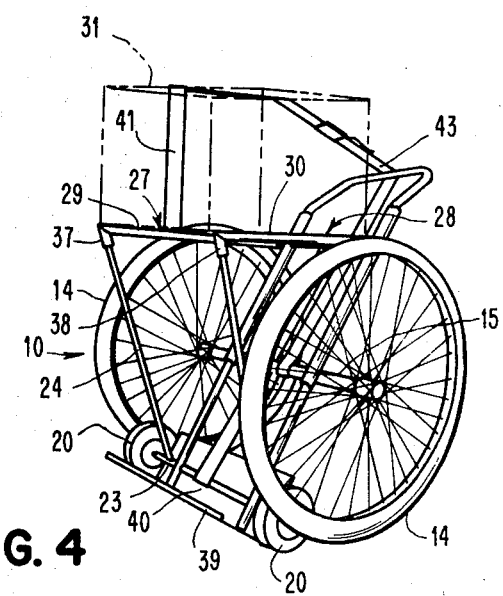
FIG. 4 is a perspective view of the cart of the present invention with the elements arranged to support a portable television set for transporting.

The hollow tubular member 24 cooperates with a hollow tubular member 27 and the hollow tubular member 26 cooperates with a hollow tubular member 28 to support the hollow tubular members 27 and 28 with portions 29 and 30 of the hollow tubular members 27 and 28, respectively, being disposed in a horizontal position to support a portable television set 31 as shown in phantom in FIG. 4. One end of each of the hollow tubular members 27 and 28 is pivotally supported on a rod 32, which has a plate 33 welded at each of its ends.

The rod 32 extends through holes in the portions 16 and 17 of the rod 18. Ends 34 and 35 of the hollow tubular members 27 and 28, respectively, are L-shaped so as to fit over the ends of the rod 32 prior to welding of the plates 33.

The plates 33 retain the ends 34 and 35 of the hollow tubular members 27 and 28 on the rod 32. However, slight sliding movement of each of the hollow tubular members 27 and 28 along the longitudinal axis of the rod 32 is obtainable between the plates 33 and the portions 16 and 17 of the rod 18.

The hollow tubular member 27 has a portion 37 (see FIG. 4) extending at an angle to the portion 29 to receive one end of the hollow tubular member 24 when the hollow tubular member 24 is to be connected to the hollow tubular member 27 to support the hollow tubular member 27 in the position of FIG. 4. Similarly, the hollow tubular member 28 has a portion 38 extending at an angle to the portion 30 to receive the end of the hollow tubular member 26 when the hollow tubular member 26 is to support the hollow tubular member 28 in the position of FIG. 4.

Because of the sliding arrangement of the hollow tubular members 24 and 26 along the axle 21 and the hollow tubular members 27 and 28 along the rod 32, the hollow tubular members 24 and 26 can be aligned with the hollow tubular members 27 and 28, respectively, or spaced from the hollow tubular members 27 and 28, respectively, as shown in FIG. 1 when the cart 10 is to be used to transport a large television set. When this is to occur, the hollow tubular members 24, 26, 27, and 28 are spaced from each other so as to lie flat as shown in FIG. 1.

The frame 11 of the cart 10 includes a plate 39, which is secured to the ends of the portions 16 and 17 of the rod 18, to function as a shelf when a large television set is transported by the cart 10. A second plate 40, which is substantially perpendicular to the first plate 39, is secured to the portions 16 and 17 of the rod 18 and to the sleeve 22. The plate 40 adds support to the axle 21 when the hollow tubular members 24 and 26 are supporting the hollow tubular members 27 and 28 as shown in FIG. 4.

A flexible strap 41 has one end secured to the sleeve 22 and its other end adapted to cooperate with a buckle 42 of a strap 43, which has one end secured to the sleeve 15. Accordingly, the straps 41 and 43 are employed to secure either the portable television set 31 or a large console television set 44 (see FIGS. 2 and 3) on the frame 11.

Considering the operation of the present invention with the large television set 44, the large television set 44 is supported on the frame 11 by being disposed on the portions 16 and 17 of the rod 18. The straps 41 and 43 then secure the television set 44 in the desired position.

Figure 2:
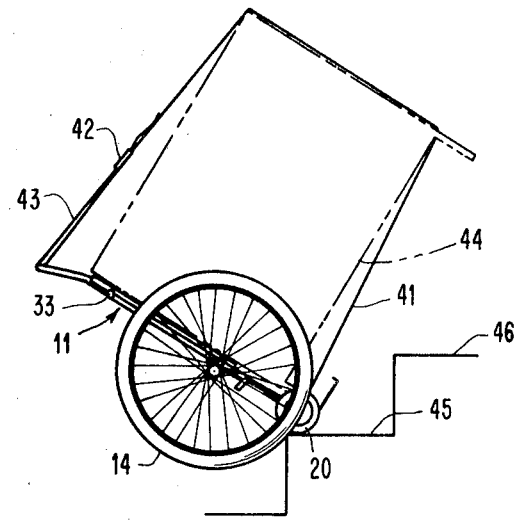
FIG. 2 is a side elevational view of the cart of the present invention showing the smaller pair of wheels supported on a step.

The initial position of the cart 10 on a step 45 is shown in FIG. 2 in which the wheels 20 rest on the flat surface of the step 45. At this time, the wheels 14 are not supported on the flat surface of the step 45.

Figure 3:
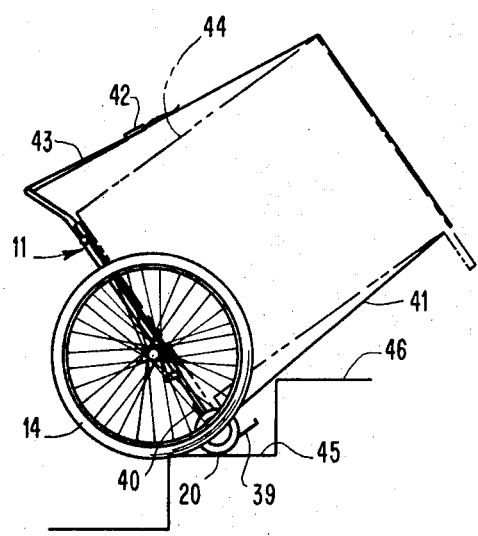
FIG. 3 is a side elevational view, similar to FIG. 2, but showing both pairs of wheels supported on the same step.

By pivoting the frame 11 clockwise (as shown in FIG. 2) about the longitudinal axis of the axle 21 of the wheels 20, the first pair of wheels 14 is advanced to the position of FIG. 3 in which the wheels 14 are now resting on the flat surface of the step 45. Then, the frame 11 is pivoted counterclockwise (as viewed in FIGS. 2 and 3) about the longitudinal axis of the axle 12 of the wheels 14 to raise the second pair of wheels 20 above the horizontal plane of a step 46, which is the next step above the step 45. With the wheels 20 above the step 46, the cart 10 is pulled slightly forward until the wheels 20 and the wheels 14 have the same relation to the step 46 as they did to the step 45 in FIG. 2. This continues until the cart 10 has been advanced to a level area.

Then, depending on how the television set 44 is supported on the cart 10, the cart 10 is rolled on the large pair of wheels 14 with the small pair of wheels 20 being elevated. The portions 16 and 17 of the rod 18 are disposed substantially parallel to the level floor at this time.

When the cart 10 is employed to transport the portable television set 31, the hollow tubular members 24, 26, 27, and 28 are arranged as shown in FIG. 4. Thus, the portable television set 31 is supported on the portions 29 and 30 of the hollow tubular members 27 and 28, respectively, with the portions 29 and 30 being substantially horizontal. When transporting the portable television set 31, both the wheels 14 and the wheels 20 roll along the level surface. The cart 10 is guided by the handle portion of the rod 18.

An advantage of this invention is that it enables one person to move a television set up and down steps. Another advantages of this invention is that it reduces the cost to pick up or deliver a television set to a customer. A further advantage of this invention is that it reduces dangers to the serviceman. Still another advantage of this invention is that it is relatively inexpensive.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A cart for transporting a television set or the like including first and second pairs of wheels, each of said wheels of said first pair of wheels having a diameter several times greater than each of said wheels of said second pair of wheels, first axle means supporting said first pair of wheels, second axle means supporting said second pair of wheels, a frame supported for pivotal movement about said first axle means, a sleeve rotatably surrounding said first axle means, said frame including a pair of substantially parallel arms secured to said sleeve, said second axle means being supported adjacent an end of said arms, said frame having a member secured to said pair of arms on the opposite side of said first axle means from said second axle means, said member being disposed substantially parallel to the longitudinal axes of said first and second axle means, a first pair of support members pivotally supported on opposite ends of said member, a second pair of support members pivotally supported by said second axle means, and cooperating means on each of said first pair of support members and each of said second pair of support members to connect each of said first pair of support members to a corresponding one of said second pair of support members to dispose said first pair of support members to support a portable television set, said second axle means being supported by said frame at a distance from the pivotal support of said frame about said first axle means and substantially parallel to said first axle means, said second axle means having its longitudinal axis spaced from the longitudinal axis of said first axle means a distance substantially the same as the radius of each of said first pair of wheels whereby the cart may be advanced up steps by placing said second pair of wheels on a first step, pivoting said frame about the longitudinal axis of said second axle means until said first pair of wheels is supported on the first step, and then pivoting said frame in the opposite direction about the longitudinal axis of said first axle means until said second pair of wheels is supported on the next higher step.

2. The cart according to claim 1 in which said second pair of wheels is disposed inside the path of said first pair of wheels.

* * * * *